US008648878B2

(12) United States Patent
Nelson et al.

(10) Patent No.: US 8,648,878 B2
(45) Date of Patent: Feb. 11, 2014

(54) INFERRING DIAGRAM STRUCTURE THROUGH IMPLICIT SHAPE RELATIONSHIPS

(75) Inventors: Mark Nelson, Kirkland, WA (US); Michael Woolf, Vashon, WA (US); Heidi Munson, Seattle, WA (US); David Bradlee, Jr., Seattle, WA (US); Evan Moran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 873 days.

(21) Appl. No.: 12/404,404

(22) Filed: Mar. 16, 2009

(65) Prior Publication Data
US 2010/0231606 A1 Sep. 16, 2010

(51) Int. Cl.
*G06T 11/20* (2006.01)
(52) U.S. Cl.
USPC ............ 345/630; 345/655; 345/666; 345/681
(58) Field of Classification Search
CPC .................................................. G06T 11/206
USPC .................. 345/630, 655, 666, 681
See application file for complete search history.

(56) References Cited

U.S. PATENT DOCUMENTS

| 4,868,766 A | 9/1989 | Oosterholt |
| 5,633,955 A | 5/1997 | Bozinovic et al. |
| 2003/0152273 A1 | 8/2003 | McCormack et al. |
| 2005/0216883 A1 | 9/2005 | Ishimitsu et al. |
| 2005/0248560 A1 | 11/2005 | Agrawala et al. |
| 2006/0209093 A1 | 9/2006 | Berker et al. |
| 2008/0231635 A1 | 9/2008 | Saund |

OTHER PUBLICATIONS

Creating ER Diagrams with MS Visio, Ricky J. Sethi, Last modified: Mon Jul. 10 14:37:13 PDT 2006, http://www.sethi.org/classes/cet415/lab_notes/lab_03.html, pp. 1-23.*
Creating ER Diagrams with MS Visio, Ricky J. Sethi, Internet Archive, Oct. 30, 2007, http://web.archive.org/web/20071030074119/http://www.sethi.org/classes/cet415/lab$_{13}$ notes/lab_03.html, pp. 1-24.*
Bajaj, Geetesh., "Tech Trax", "AutoShape Magic, Part IV", retrieved at <<http://pubs.logicalexpressions.com/pub0009/LPMArticle.asp?ID=699>>, Dec. 5, 2008, pp. 1-6.
Fuschetto, Susan., "Visio 2003 Professional Basic Tutorial", retrieved at <<http://www.cerritos.edu/bnegrete/olcourses/CIS103/Fuschetto/Visio%20Tutorial.pdf>>, Aug. 22, 2004, pp. 1-13.
Angeles, Michael., "Automating Diagrams with Visio", Boxes and Arrows : The Design Behind the Design, November Issue 2008, retrieved at <<http://www.boxesandarrows.com/view/automating_diagrams_with_visio>>, Apr. 9, 2002, pp. 1-37.

* cited by examiner

*Primary Examiner* — Jeffery A Brier
(74) *Attorney, Agent, or Firm* — Turk IP Law, LLC

(57) ABSTRACT

Information in a diagram is logically structured using lists, containers, and callouts without requiring the diagram author to explicitly define a structure or map any diagram contents to a structure. Logical relationships are inferred based on actions associated with shapes, groupings, and attributes of shapes/groupings taken by the author. Feedback mechanisms are provided to communicate an underlying structure to the author. Intelligent behaviors are enabled to expose manipulation of diagrams based on their logical structure.

16 Claims, 9 Drawing Sheets

INFERRING DIAGRAM STRUCTURE THROUGH IMPLICIT SHAPE RELATIONSHIPS

BACKGROUND

Organizational techniques such as cleanly arranged shapes, visual groupings of relating items and descriptive text improve readability of a diagram and enable users to better organize the diagrams. With conventional diagramming applications, users typically spend a lot of time managing the shapes in their diagram to achieve good visual results. Conventional diagramming applications either allow freeform diagramming or structured diagramming. In freeform diagramming authors can arrange content however they like, but no logical relationships are defined by the content. The diagram is simply a picture and interpretation of any diagram meaning is done by the viewer not the software. In structured diagramming authors arrange content according to explicit rules or by invoking specific commands to define the relationships in the diagram (for example, using a compose group command to positionally associate shapes together that generates a composite shape from several individual shapes).

In the freeform approach, the diagram cannot be used with other software tools or features that act on logical relationships since no relationships exist. With the structured approach, authors struggle to discover, learn, and properly use structuring commands to define logical relationships.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a mechanism by which information in a diagram may be logically structured without requiring the diagram author to explicitly define a structure or map any diagram contents to a structure. According to some embodiments, logical relationships may be inferred based on actions taken by the author. Feedback mechanisms may be provided to communicate an underlying structure to the author. According to other embodiments, intelligent behaviors may be enabled to expose manipulation of diagrams based on their logical structure.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
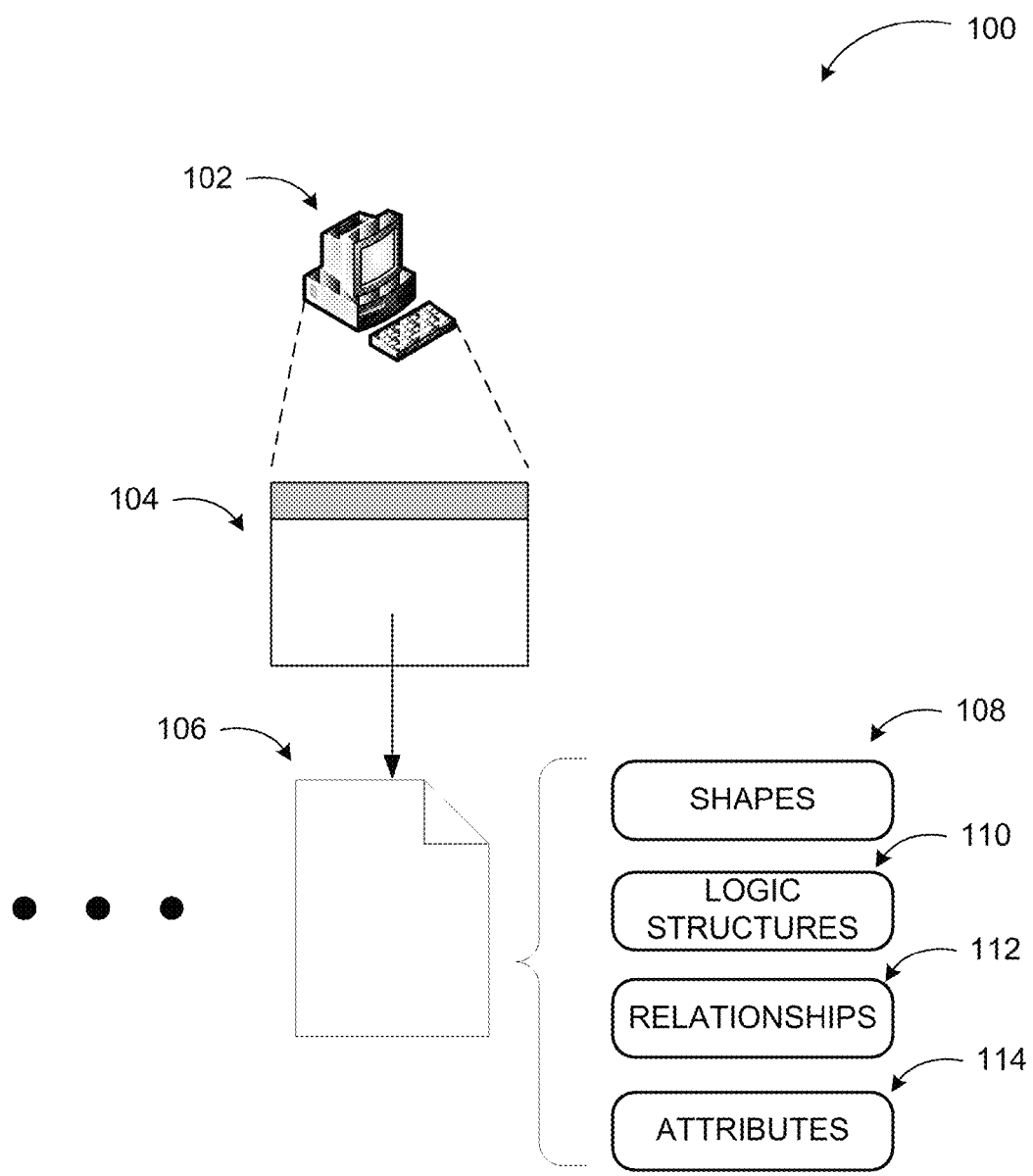
FIG. 1 is a conceptual diagram illustrating an example diagramming application and major components of a diagram.

As briefly described above, logical relationships may be generated automatically in a diagram canvas as the diagram author uses the software without requiring extra actions to be taken by the author to set up the relationships. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for providing diagramming services. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, conceptual diagram 100 of an example diagramming application and major components of a diagram document, is illustrated. Diagramming application 104 executed on computing device 102 is an example software program for generating and editing diagrams. A diagram is typically generated on a canvas using shapes (108), images, textual elements, and comparable ones. Diagram elements may be placed on the canvas manually, automatically, or semi-automatically based on user actions. Each of the diagram elements has their own attributes (114). Relationships and logic structures (110, 112) may be created between the diagram elements such as shapes explicitly or through implication. The diagram with its elements, relationships, and other information may be saved as a diagram document 106.

According to other embodiments related shapes possess special behaviors in the diagramming application. For example, once a shape is contained by another it automatically may be moved, copied, or deleted as its container is moved, copied, or deleted. Yet the contained shape is still available for direct manipulation just as it is when it is not in a relationship with another shape. In contrast, a traditional behavior like composing a group limits access to the shapes contained by the group, so there is an interactivity tradeoff when forming this explicit logical relationship.

With a shape that is designated as a list, container, or callout, there are relationships that may be established with other shapes. Shapes may be added to lists and containers, and callouts may be associated with other shapes. Embodiments provide a means for automatically forming and breaking these logical relationships based on simple actions taken by the diagram author/editor. For example, moving a shape onto a list or container forms a relationship; moving the shape off the list or container breaks a relationship; moving a callout (or callout leader line) onto a shape forms a relationship; moving the callout off breaks a relationship.

Logical relationships have no visible aspect, so a set of visible feedback mechanisms are defined to indicate the relationships exist, are being created, or are being broken. A visual feedback may notify the author that their standard action of moving a shape on the canvas will also affect logical relationships. Once a relationship exists, the diagramming application may provide a number of behaviors to manage the shapes involved in the relationship. These behaviors include moving, copying, and deleting shapes involved in a relationship. They also include rearranging the contents of lists and expanding the boundaries of containers as member shapes change. Additional controls may be exposed to the author to customize some of these behaviors.

According to further embodiments, relationships may be combined together to form more specialized behaviors in a diagram. An example of this is placing a set of containers into a list. The containers each manage their own member shapes and then are themselves arranged by the list shape.

While the diagramming application and diagramming actions in FIG. 1 have been described with specific example elements, attributes, and behaviors, embodiments are not limited to the example components and behavior. Embodiments may be implemented with other shape types, behaviors, and feedback mechanisms using the principles described herein.

Figure 2:
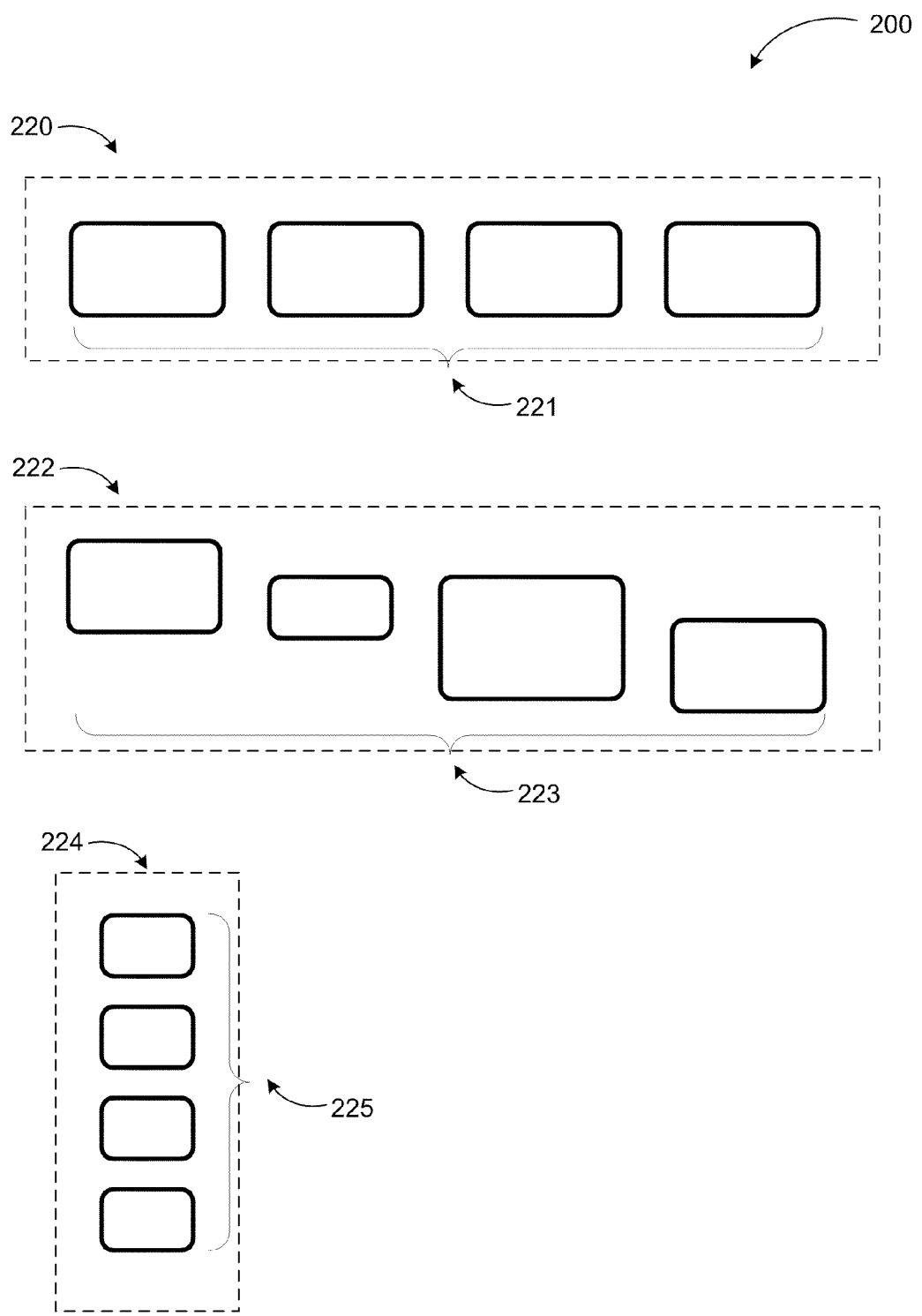
FIG. 2 illustrates example shape groupings in lists in a diagram according to embodiments.

FIG. 2 illustrates example shape groupings in lists in a diagram according to embodiments. Lists are ordered sets of shapes. The shapes may be connected or unconnected, although unconnected shapes are more common in a list. Lists can be found in drawings such as cross-functional flowcharts, legends, block diagrams and network diagrams. In conventional applications, users commonly rely on hand positioning, alignment, distribution, nudging, and other techniques to organize shapes in lists and maintain them. Thus, lists manage the arrangement of a sequence of shapes.

Diagram 200 shows three example list structures. List outlines are necessarily not visible. List 220 includes shapes 221 aligned on a horizontal axis. List 222 includes shapes 223. As shown in the figure, shapes within a list do not have to have similar form or be aligned along horizontal or vertical (e.g. list 224 of shapes 225 aligned along the vertical axis) axes only. Shapes 223 of list 222 are ordered in a descending format (i.e. their alignment axis is at a predefined angle to the horizontal).

In a diagramming application, shapes may be added to a list using one of the insert commands exposed by the list or by dragging action by the authors. Adding a shape to a list does not affect its connectivity or callout associations. A list provides a mechanism for clicking directly on the diagram surface to insert items in a list. When the cursor moves near a potential insertion point, a list insertion icon may appear in a semi-transparent state or on a menu bar. The list container boundary may be highlighted as well. The icon and highlight may disappear once the cursor moves away from the insertion point. The user may add a new or existing shape to a list by dragging it onto an insertion icon or into the list container. If the cursor hovers over the insertion icon, a tooltip may appear reading "Insert Shape".

The user may be enabled to drag multiple shapes at once to insert them at the insertion location. The cursor determines the insertion location. All allowable shapes in the selection are inserted at the insertion location. Non-allowable shapes are simply dropped at the location where they are released on mouse-up. Once the new shape or shapes are dropped and inserted, the list may be automatically rearranged to fit the new shapes. Shapes not allowed in the list as list members may be checked to determine if they can be added to the list container as regular container members. Any shapes allowed in the list container may be added to the list container. According to some embodiments, these shapes may be silently added to the container with no highlighting feedback or shape rearrangement, and the list container may not expand to fit the shapes. Shapes may support multiple kinds of relationships, such as lists that can also function as a container.

A shape may not be a member of both a list and a partially overlapping container (a container that is not a member of the list). List members in containers that fully overlap (spatially include) the list of containers may be contained. If a member of an overlapping container is successfully added to a list, the shape is removed from the overlapping container. If a list member is successfully added to an overlapping container, the shape is removed from the list.

As mentioned above, shapes may be removed from a list through any of the regular mechanisms for removing a shape from a container. Once a shape has been removed, the remaining shapes in the list are rearranged. A shape or shapes may be dragged out of a list with the cursor being dragged outside the list container alignment rectangle. The list container may be highlighted when any list member shape is selected. Once the cursor moves outside the list container, the list container highlight may disappear to signal that the shapes are free. Dragging multiple shapes out of a list does not preserve any list association between the selected shapes (i.e. dragging out a portion of a list does not produce another list).

When a list member's position is changed by the action or through automation, its new rank within the list may be determined and the list rearranged based on the new order. If a position change is not significant enough to change the rank, the shape may be snapped back into its previous position. If a position change takes the shape out of the list container, the shape is removed from the list. When a shape's position moves because of an action other than mouse drag, the center of the shape's alignment box may be used to determine rank.

As mentioned previously, lists are defined by a list container, whose outline may be invisible. Lists can be moved by dragging the list container shape. The shapes in the list container move with the list container. While dragging, outline rectangles for the list container and all list members may be displayed.

Lists may be resized in the same ways containers may be resized. However, list containers are assumed to form tight boundaries around their contents. Any resize may trigger a "fit to contents" action adjusting the boundaries for the list container. One exception is that resizing a list of containers causes containers to grow or shrink with the list.

Cut or copy actions a list container shape automatically place all list member shapes on the clipboard. The container and contents are added to the page on paste action. The contents may be deleted manually by the user after the paste operation if they desire. Cut or copy actions on list member shapes, however, do not place the list container shape on the clipboard. The pasted shapes may not have any list association between the shapes (i.e. copying a portion of a list does not produce another list). Duplicating a list container shape may also duplicate the contents of the list, creating a whole new list. Duplicating a list member shape is the equivalent of selecting that shape and inserting it at the selected location.

Shapes may be pasted directly into a list if the shapes are added to the diagram within the list container's boundary. Adding the shape to the list is subject to the normal membership requirements (allowable shape, unlocked container). When a container and member shapes are pasted on a list, only the container is a candidate for membership in the list. The container member shapes are not added to the list.

Lists are deleted by deleting the list container shape. Deleting a list container shape also deletes all member shapes. Lists are not deleted when their last member shape is removed. Direction, spacing, and alignment attributes specified in the list container shape may be used to calculate shape positions when arranging a list. If attributes or values are missing, default values may be used. In an arrangement operation, the diagramming application may start from one edge of the list container shape (the edge depends on the list direction attribute) and place the first list member near the edge—spaced according to the list container margin attribute for that edge. Following the list direction attribute, subsequent member shapes may be positioned relative to the previous member shape. In order to properly space the shapes, an upright bounding box may be used for each shape (which may include some or all its sub-shapes) and shapes separated based on the list spacing attribute. The next shape may be aligned based on the list's alignment property.

When shapes have to be rearranged due to a change in direction attribute, the member shapes and list container may be positioned such that their new bounding region is centered on their previous bounding region. This reduces the scenarios where a change of direction causes overlap with other parts of the diagram. When all members of the list have been arranged, the list container shape may be resized and positioned to bound all the contents. The current margin setting may be applied to the gap between the container shape and the contents.

Figure 3:
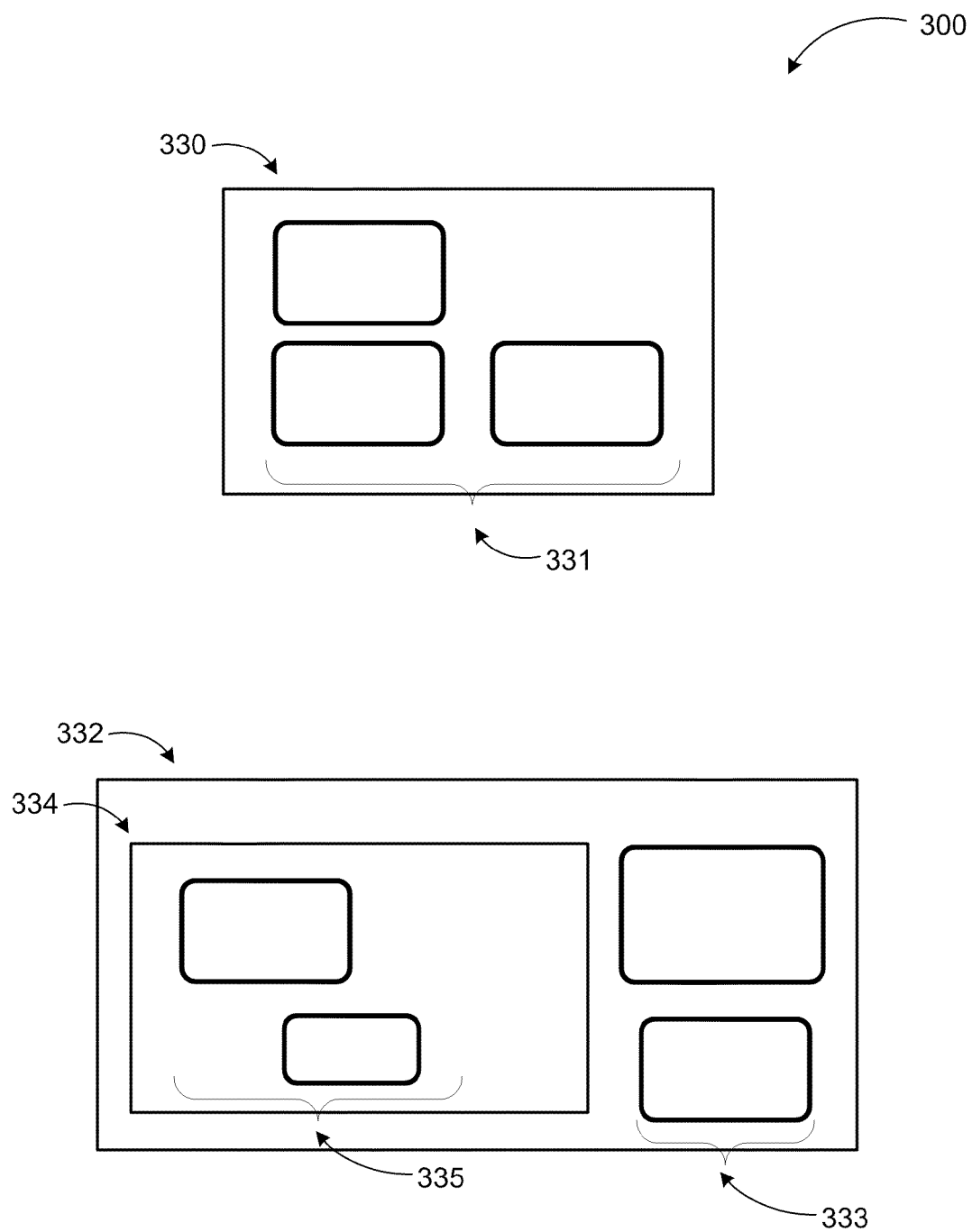
FIG. 3 illustrates example shape groupings in containers in a diagram according to embodiments.

FIG. 3 illustrates example shape groupings in containers in a diagram according to embodiments. Containers are collections of shapes surrounded by a visible border (e.g. container 330 and shapes 331). Users may create a container relationship by drawing a box around existing shapes in a diagram. Tasks such as automatically resizing the container or moving all the contents with the container only work in conventional applications when the user formalizes the containment by composing a group from the shapes. This pulls the shapes off the drawing page and makes interaction much more difficult. Likewise simply having a filled region for the container creates problems with shape z-order and selection. Z-order is the order that determines how shapes occupying the same physical space are overlapped.

Containers according to embodiments bound a set of shapes with a visible or invisible border and influence their behavior without abstracting them from the canvas. Containers may also have a text heading. Differently from conventional relationships, containers do not become the parent shape for their contents, and include special behaviors that make it easy to continue working with the shapes inside the container. A shape may belong to multiple containers (e.g. shapes 335 and containers 332, 334). A container may include other containers in addition to the shapes (container 332 with its shapes 333 including also container 334 with its shapes 335). The container manages the position of its member shapes by moving the shape whenever the container moves—though the user may still move the shape around independently from the container. The container copies and deletes its member shapes whenever the container is copied or deleted. Users are able to add and remove shapes simply by dragging them in and out of the container boundary.

Container membership behaviors may apply to lists in addition to the special behaviors described in this section. A container shape may be locked to prevent members from being added or removed. If the container shape is locked, no insertion UI may be shown and insertion commands may be disabled.

According to some embodiments, a shape that is a member of a container has a member state that defines the behavior of the shape with respect to the container (the same mechanism is used for list containers as well). An "interior" state is the normal member state. Shapes in this state generally are in interior spatial relationships. Interior members that are not currently interior spatially are in a transient state. The "On Boundary" state is a special member state for shapes placed on the edge of a container. Shapes in this state are in the on boundary spatial relationship. Shapes move with the container edge to remain in this state. An on boundary shape is anchored to the container edge. A shape may be anchored to one horizontal edge and one vertical edge. The edges may be in different containers. The "Outside" state is a transient member state where a member is spatially outside the container. This typically occurs when a drawing has been modified outside of the diagramming application. These shapes become interior spatially in a future container resize operation. Finally, the "In List" state is a special state for members of lists. Shapes in this state have an interior spatial relationship.

An author of the diagramming application is enabled to move shapes around inside a container using the mouse or keyboard or other means to explicitly set position such as a command through the menu bar. If a shape is moved outside the container boundary, the shape is removed from the container.

Figure 4:
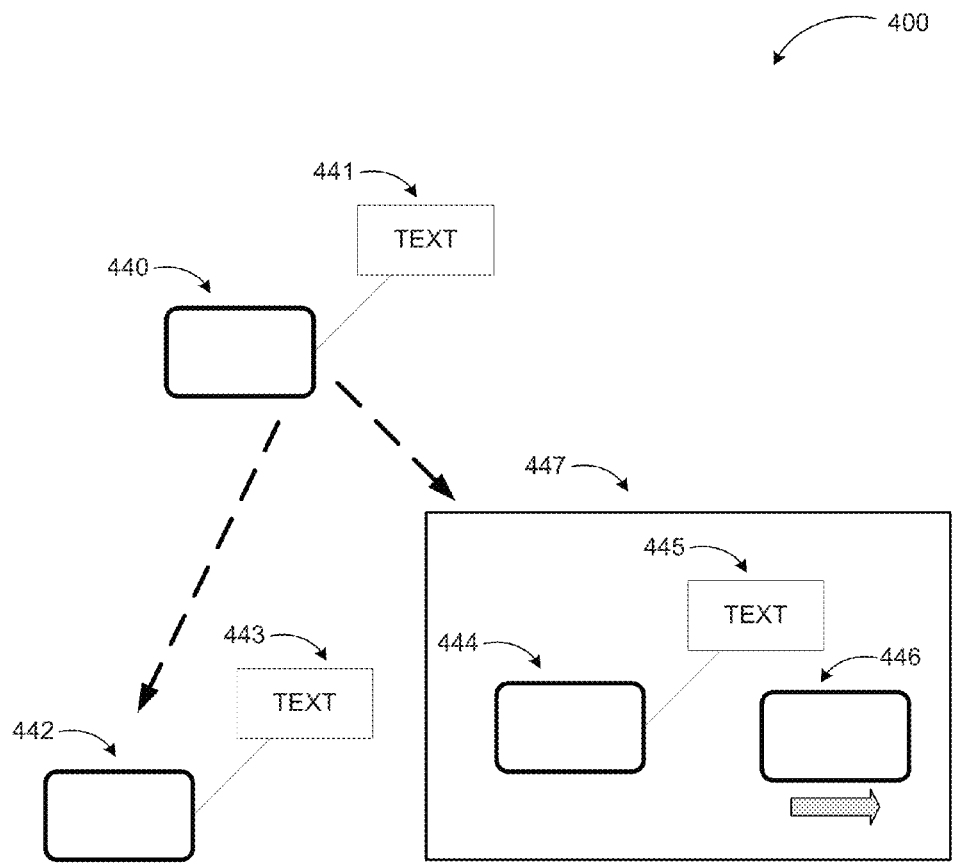
FIG. 4 illustrates example callouts and their automatic handling in a diagram according to embodiments.

FIG. 4 illustrates example callouts and their automatic handling in a diagram 400 according to embodiments. Callouts are "word balloons" that describe other shapes in the diagram. This form of annotation is common in diagrams. Callouts can be connected to another shape, but the user must manually ensure that the callout moves with the shape. This is cumbersome and fails to work with certain layout features.

Callouts are a special type of shape (e.g. 441) that can form a logical association with another shape (a target shape) 440 on the page. Callouts allow the user to type in a description or comment about the target shape as an annotation to the diagram. A callout shape can be associated with another shape by dragging a user interface element indicating the callout's target shape from the callout shape and dropping it on the target shape. Z-order (an order of which shape was placed on the canvas over another) determines which shape is the target for the control handle. Any previous association may be removed and a new association created.

In a diagramming application according to embodiments, a callout associated with a target shape moves with the target shape. In this arrangement, moving the callout changes the offset distance from the target while moving the target causes both shapes to move by the same amount. For example, if target shape 440 is moved to a new location (target shape 442) callout 441 is also moved to the location of callout 443 retaining its size and offset from target shape 442. Callouts are added to regular containers when they are moved inside the container boundary. Callouts may be resized like normal shapes.

When a target shape is cut, copied, or duplicated, any associated callout shapes are also copied. When a callout shape is copied and pasted without its target shape, the new callout becomes unassociated. Callouts do not automatically associate with new shapes when the callouts are pasted on top of them. Callouts can be deleted like normal shapes. Deleting a target shape will also delete any associated callout shapes. Callout shapes that are placed into groups without their target shape may become unassociated. Target shapes that are grouped without their callouts may become unassociated from the callouts.

As a result of composing a group (e.g. in a container), callout positions may be modified without breaking the callout—target shape association. For example, upon moving target shape 440 and its callout 441 into container 447 along with the new shape 446, callout 445 may be moved to accommodate the new shape, while the relationship with its target shape 446 is maintained.

Figure 5:
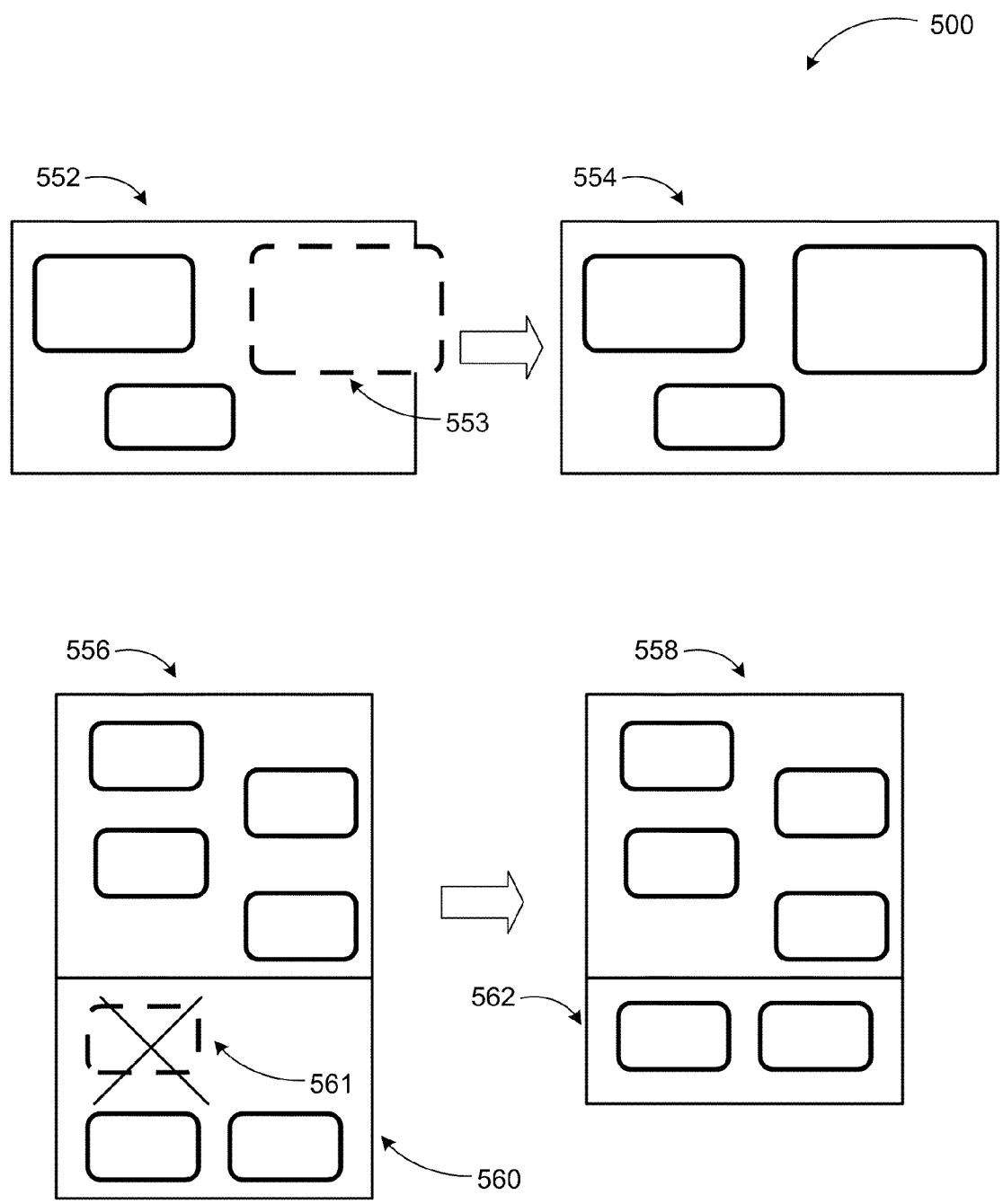
FIG. 5 is illustrates example container adjustments in a diagram according to embodiments.

FIG. 5 is illustrates example container adjustments in a diagram according to embodiments. A container shape and member shapes inside a container may be resized freely using the mouse or keyboard or other means to control shape size in a diagramming application according to embodiments. A shape may not be resized out of the container, however. On boundary shapes may not be resized such that they no longer overlap the boundary either.

Diagram 500 illustrates two basic resizing actions. In the first one, one of the member shapes 553 of container 552 is enlarged causing the member shape to exceed the container. The resulting container 554 is a large (resized) version of container 552 encompassing all three shapes.

In the second example, Container 556 includes four member shapes and a second container 560 with three member shapes of its own. Containers 556 and 560 are arranged within a list (not shown). One of the member shapes (561) of container 560 is deleted by the user resulting in resized (reduced) container 562 and 558. The resizing of containers may be automatic or it may be presented to the user as an option and performed upon user acceptance of the resizing. Containers may be resized with some restrictions on their behavior. While a container may increase in size with no restriction, a container may decrease in size until the containment state of any member shape would change. In general, member shapes do not move when the container is resized. However, shapes designated as on boundary may be repositioned with the container edge they sit on.

By using the inferred relationships between containers and member shapes, other special behaviors may also be enabled. For example, moving a container shape may cause all member shapes to move along by the same amount. Containers moved on top of other shapes do not pull those shapes into the container. Shapes moved because their container is moved may be added to any other containers they now overlap. If shape protections prevent shapes from moving with their container they may be removed from the container. Effectively the behavior is equivalent to moving the shapes with the container and then moving the shapes back to their original position. If the shape is outside the container, it is removed. The container may resize as described above. If a shape is a member of multiple containers, it moves with whatever container is moving at the moment. This action may reposition the members relative to other containers and may remove them from the other containers entirely.

Cut or copy actions on a container shape automatically place all member shapes on the clipboard. If the members are themselves containers, their members are recursively added as well. The container and contents are added to the canvas on paste. The contents may be deleted manually by the user after the paste operation if they desire.

Cut or copy actions on member shapes do not place the container shape on the clipboard unless the container shape is also in the selection. When pasting a member of a container, the new shape is only added to underlying containers if its parent is added (if the parent is already on the clipboard). On the other hand, if the member's parent is not on the clipboard, the new shape is added to any underlying containers—subject to normal membership requirements.

Duplicating a container shape also duplicates the contents of the container, creating a whole new container. Locked containers may be duplicated, creating another locked container. When duplicating a member of a container: if the member's parent is also selected, the new shape is only added to underlying containers if its parent is added; if the member's parent is not selected, the new shape is added to any underlying containers—subject to normal membership requirements.

Deleting a container also deletes the member shapes of the container; unless those shapes are also members of other containers that are not ancestors of the deleted container (deleting an inner nested container will delete its contents). Containers can be nested together. For a container to be nested, it must be entirely within the boundary of its parent container. If a container is not fully dragged into another container, it is considered to overlap—not nest. When a container is nested inside a parent, all member shapes of the parent that are also members of the inner container now become members of both containers. When a nested container is moved so that it overlaps or lies outside its parent container, it is removed from the parent container. Any member shapes of the nested container are checked for containment to see if they should be removed from the outer container.

Figure 6:
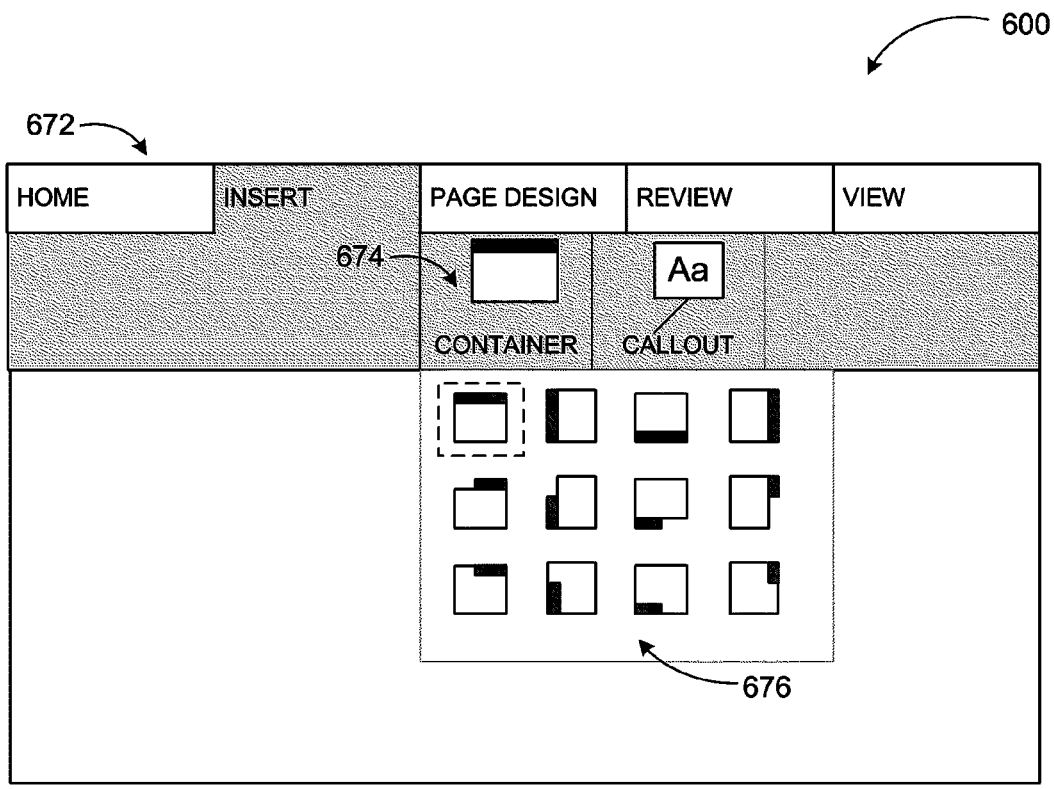
FIG. 6 illustrates example user interface elements for container and callout selection in a diagram according to embodiments.
Figure 6:
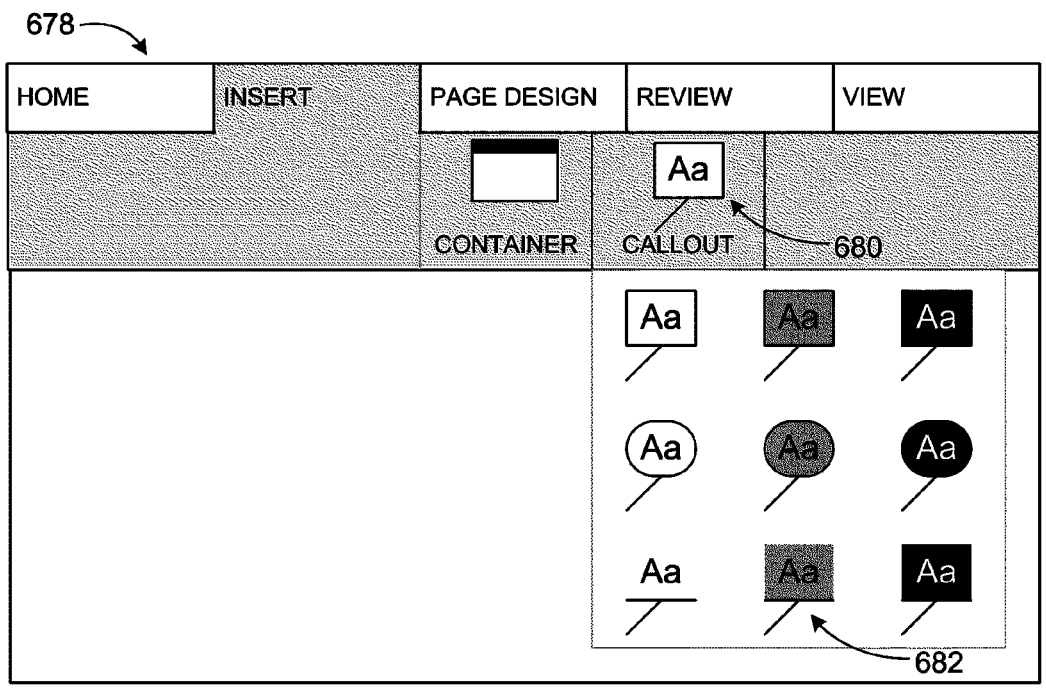

FIG. 6 illustrates example user interface elements for container and callout selection in a diagram according to embodiments. The above discussed special behaviors may be performed automatically, in response to a drag action by the author of the diagram, or by selection of commands in a menu bar. The user interfaces 672 and 678 in diagram 600 illustrate example insert command options for containers and callouts, respectively.

An icon 674 for inserting containers may open a graphic menu of available containers (676) with different textual element options (e.g. a title for the container). While the containers in example user interface 672 are shown having rectangular shape, other shapes may also be used. Furthermore, other attributes of available containers in addition to textual elements may also be presented for selection.

User interface 678 shows an example insert menu presenting available callouts for selection. Upon selection of callout icon 680, available callout types 682 are displayed with varying shapes and outline types (line, no line, etc.).

A user interface for a diagramming application inferring logic relationships from shapes may include additional or fewer textual and graphical elements, and may employ various graphical, color, and other configuration schemes to display different functionalities and associated processes.

Figure 7:
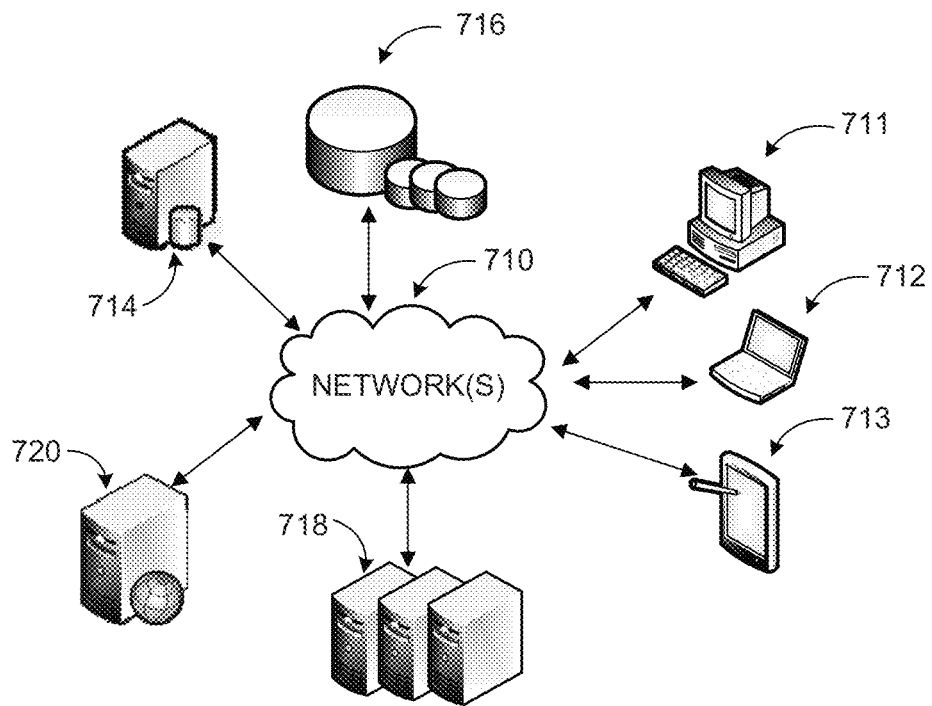
FIG. 7 is a networked environment, where a system according to embodiments may be implemented.

FIG. 7 is an example networked environment, where embodiments may be implemented. A platform providing diagramming services may be implemented via software executed over one or more servers 718 such as a hosted service. The platform may communicate with client applications on individual computing devices such as a handheld computer 713, a laptop computer 712, and desktop computer 711 (client devices) through network(s) 710.

As discussed above, information in a diagram may be logically structured without requiring the diagram author to explicitly define a structure or map any diagram contents to a structure. A diagramming application executed on one of the client devices 711-713 or in a distributed manner in one or more of the servers 718 may infer logical relationships based on actions taken by the author. The application may provide feedback mechanisms to communicate an underlying structure to the author. Data associated with rendered diagrams may be stored in one or more data stores (e.g. data store 716), which may be managed by any one of the servers 718 or by database server 714.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks (e.g. external network(s) 720). Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a diagramming service with diagram structure inference from implicit shape relationships. Furthermore, the networked environments discussed in FIG. 7 are for illustration purposes only. Embodiments are not limited to the example applications, modules, or processes.

Figure 8:
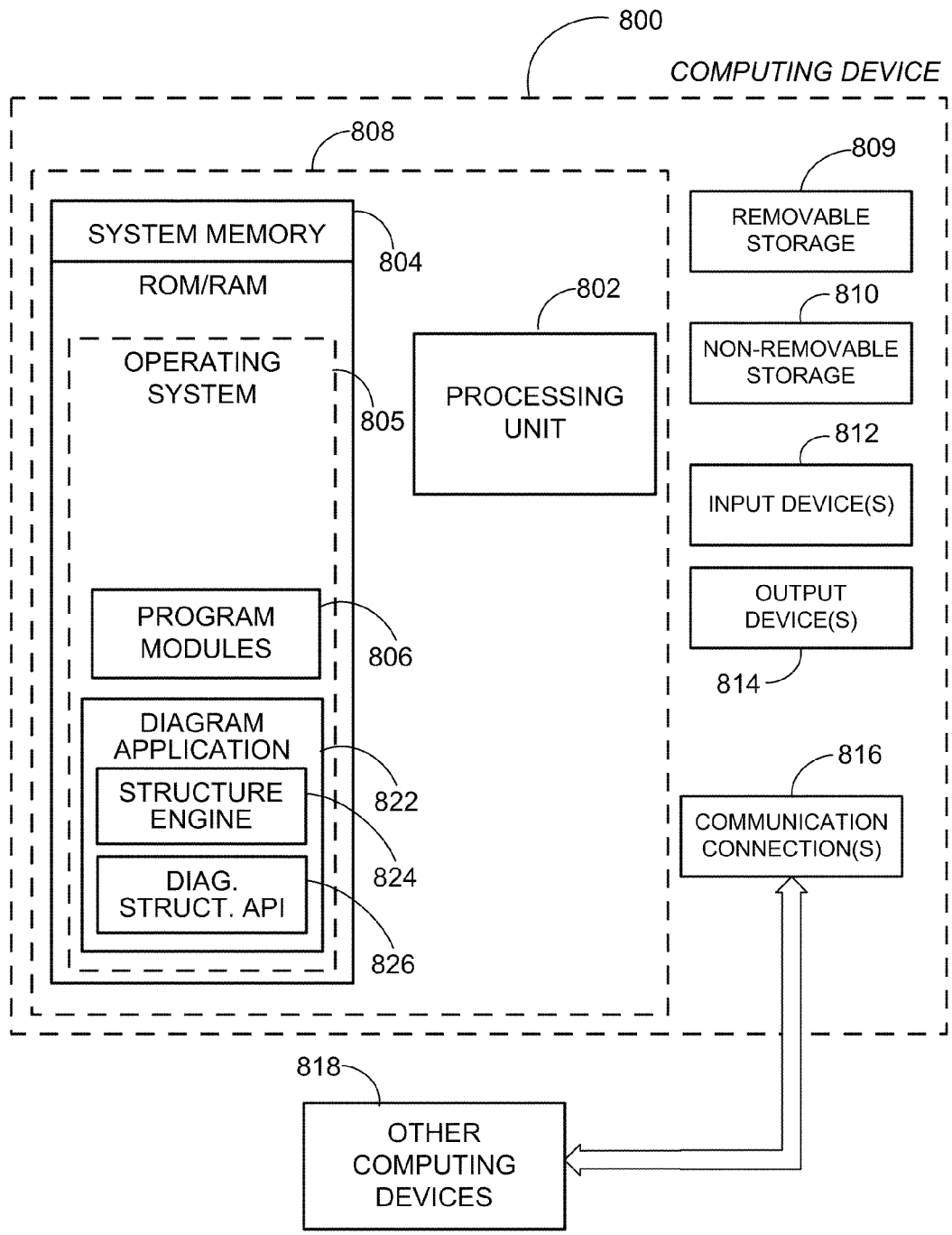
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a computer executing a diagramming application and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, diagramming application 822, structure engine 824, and diagram structure API 826.

Diagramming application 822, structure engine 824, and diagram structure API 826 may be distinct modules or an integrated service providing diagramming services with logic relationship and structure inference based on shapes and user actions on a canvas. Structure engine 824 may be a specialized component of diagramming application 822 analyzing shape positions, attributes, user actions, and determining relationships based on those. Special behaviors may be enabled based on the inferred relationships and structures. Diagram structure API 826 may define categories of shape groupings such as lists, containers, and callouts, as well as their attributes for use by the diagramming application 822 and other applications interacting with the diagramming application 822. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, email or presence servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
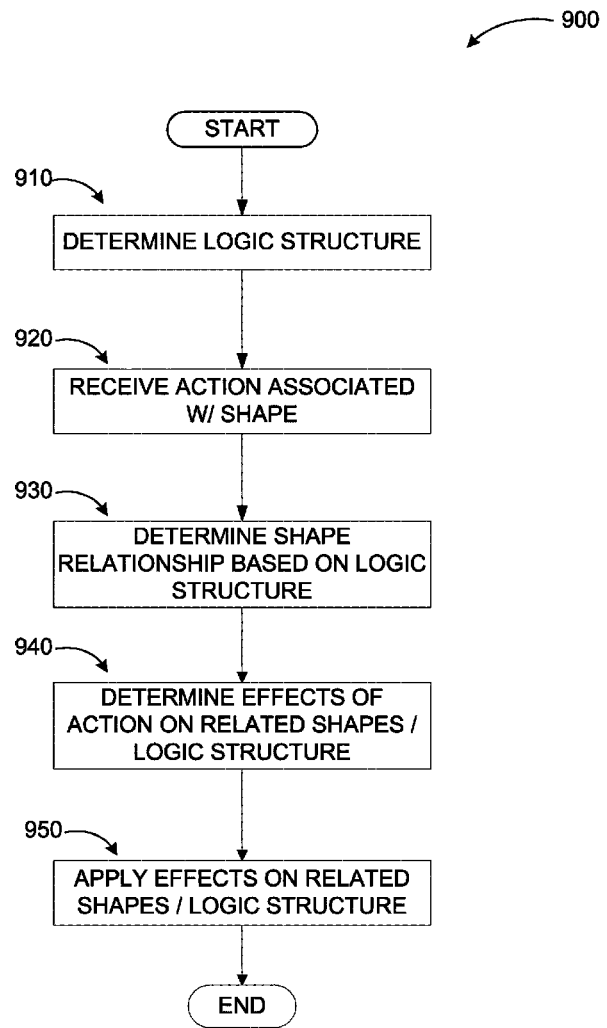
FIG. 9 illustrates a logic flow diagram for managing shapes in relationships based on grouping in a diagram according to embodiments.

FIG. 9 illustrates a logic flow diagram of process 900 for managing shapes in relationships based on composing a group in a diagram according to embodiments. Process 900 may be implemented as part of a diagramming application.

Process 900 begins with operation 910, where a logic structure between shapes on a diagram canvas is determined based on position, interrelations, and attributes of the shapes. At operation 920, an action associated with one or more of the shapes is received. This may include a mouse-based action such as dragging a shape or a command based action through selection of a command in a menu. At operation 930, a relationship of the affected shape(s) is determined based on the logic structure. For example, a shape that is part of a list (or a container) may be moved by the author.

The effects of the author's action on the related shapes and logic structure may be determined at operation 940. For example, moving of a shape out of a list or container may affect the ordering of the remaining shapes as well as a sizing of the list or container. At subsequent operation 950, the effects of the actions are applied to the related shapes and logic structure. Following the above example, remaining shapes may be re-ordered and the list or container resized automatically to account for the removal of the shape by the author.

The operations included in process 900 are for illustration purposes. Inferring diagram structure through implicit shape relationships may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed on a computing device for creating and modifying a diagram structure through implicit shape relationships, the method comprising:

determining a logic structure of a plurality of shapes on a diagram canvas through a user interface for a diagramming application provided by a processor of the computing device;

receiving an action associated with at least one of the plurality of shapes at a structure engine of the diagramming application executed by the processor;

determining a relationship between the at least one of the plurality of shapes and other shapes within the logic structure at the structure engine executed by the processor;

determining effects of the received action on the at least one of the plurality of shapes and the other shapes at the structure engine executed by the processor;

applying the effects to the at least one of the plurality of shapes and the other shapes through the user interface provided by the processor; and displaying the plurality of shapes on the diagram canvas through a display device associated with the computing device.

2. The method of claim 1, wherein the logic structure includes a position, and order, and an interconnection of the plurality of shapes on the canvas.

3. The method of claim 1, wherein the relationship between the at least one of the plurality of shapes and the other shapes includes at least one from a set of:

the shapes being in a list, the list comprising an ordered set of unconnected shapes;

the shapes being in a container, the container comprising a collection of shapes surrounded by a border; and the shapes having a callout attached to them.

4. The method of claim 3, further comprising:

determining at least one special behavior based on the relationship at the structure engine executed by the processor; and applying the effects based on the special behavior associated with the received action through the user interface provided by the processor.

5. The method of claim 4, wherein the at least one special behavior is associated with one of: copying a shape, moving a shape, deleting a shape, rearranging related shapes, and adjusting boundaries of a list or container encompassing the related shapes.

6. The method of claim 4, wherein the effects are applied based on the special behavior and an attribute of each affected shape, the attribute including at least one from a set of: a direction, a spacing, and an alignment of each affected shape.

7. The method of claim 3, wherein shapes included in the list are rearranged in response to the received action based on an attribute of each shape, an attribute of the list, and wherein invisible boundaries of the list are resized in response to the received action.

8. The method of claim 3, wherein the relationship between the at least one of the plurality of shapes and the other shapes further includes at least one from a set of: at least one container within a list, at least one list within a container, a nested container, at least one shape associated with a callout within a list, and at least one shape associated with a callout within a container.

9. A computing device for executing a diagramming application capable of creating and modifying a diagram structure through implicit shape relationships, the computing device comprising:

a memory storing instructions for executing the diagramming application;

a processor coupled to the memory for executing the instructions, the processor configured to:

infer a relationship between a group of shapes on a diagram canvas, the relationship including one of: a list, a container, and a callout association from a positioning and an attribute of the shapes at a diagram structure application programming interface (API) of the diagramming application executed by the processor;

receive an indication of an action associated with at least one of the shapes at a structure engine of the diagramming application executed by the processor;

determine effects of the action on the at least one of the shapes, remaining shapes in the group, and the group at the structure engine executed by the processor;

provide a feedback associated with the effects to a user through a user interface for the diagramming application provided by the processor;

apply the effects of the action to the at least one of the shapes, the remaining shapes in the group, and the group at the structure engine executed by the processor; and display the group of shapes on the diagram canvas through a display device associated with the computing device.

10. The computing device of claim 9, wherein the processor is further configured to receive an indication of another action associated with the entire group of shapes.

11. The computing device of claim 10, wherein the processor is further configured to apply the effects of the action based on a special behavior assigned to the group of shapes based on a type of the group and, wherein the special behavior is associated with one of moving, copying, deleting, rearranging, and resizing one of the shapes and the group.

12. The computing device of claim 10, wherein the group is a list and the special behavior includes one of:

adding a new shape to the list upon insertion of the new shape to the list through a graphical command by the user at the diagram structure API executed by the processor;

removing a shape from the list upon removal of the shape from the list through a graphical command by the user at the diagram structure API executed by the processor;

rearranging shapes within the list upon one of addition and removal of a shape at the diagram structure API executed by the processor;

copying all shapes in the list upon copying of the list at the diagram structure API executed by the processor;

moving all shapes in the list upon moving of the list at the diagram structure API executed by the processor; and creating a new list upon moving of a portion of the shapes within the list at the diagram structure API executed by the processor.

13. The computing device of claim 10, wherein the group is a container and each shape within the container includes a member state from a set of:

an interior state designating a shape as having an interior spatial relationship with the container;

an on boundary state designating a shape as being placed on an edge of the container, wherein the shape having on boundary state are processed to remain in on boundary state; and an outside state designating a shape as being spatially outside the container.

14. The computing device of claim 13, wherein the container is resized in response to a shape within the container being moved, and wherein an on boundary shape retains its state in response to the container being resized.

15. The computing device of claim 9, wherein the processor is further configured to:

provide the user interface for the diagramming application that includes elements for at least one from a set of: inserting a shape, creating a group, assigning attributes to the shapes, assigning attributes to the group, indicating the action on the shapes at the structure engine executed by the processor.

16. The computing device of claim 9, wherein the relationship is a callout association and a callout is subjected to the same action applied to a target shape associated with the callout.

* * * * *